(12) United States Patent
Katoh et al.

(10) Patent No.: US 8,298,341 B2
(45) Date of Patent: Oct. 30, 2012

(54) REMOVAL OF METAL CONTAMINANT DEPOSITED ON QUARTZ MEMBER OF VERTICAL HEAT PROCESSING APPARATUS

(75) Inventors: Hitoshi Katoh, Oshu (JP); Tsuneyuki Okabe, Oshu (JP); Kohichi Orito, Oshu (JP); Takashi Chiba, Oshu (JP)

(73) Assignee: Tokyo Electron Limited, Tokyo (JP)

( * ) Notice: Subject to any disclaimer, the term of this patent is extended or adjusted under 35 U.S.C. 154(b) by 452 days.

(21) Appl. No.: 12/431,232

(22) Filed: Apr. 28, 2009

(65) Prior Publication Data

US 2009/0293908 A1    Dec. 3, 2009

(30) Foreign Application Priority Data

May 29, 2008    (JP) .................. 2008-140714

(51) Int. Cl.
*C23G 1/02*    (2006.01)
(52) U.S. Cl. .............. 134/3; 134/2; 134/18; 134/26; 134/27; 134/28; 134/34; 134/36; 134/41; 134/42; 134/56 R; 134/61; 134/64 R; 134/76; 134/902
(58) Field of Classification Search .......... 134/2, 3, 134/18, 26, 27, 28, 34, 36, 41, 42, 56 R, 61, 134/64 R, 76, 902
See application file for complete search history.

(56) References Cited

U.S. PATENT DOCUMENTS

| | | | | |
|---|---|---|---|---|
| 5,364,510 A | * | 11/1994 | Carpio | 134/2 |
| 5,418,395 A | * | 5/1995 | Nagata et al. | 257/103 |
| 5,472,513 A | * | 12/1995 | Shiramizu | 134/3 |
| 5,679,171 A | * | 10/1997 | Saga et al. | 134/3 |
| 6,099,662 A | * | 8/2000 | Wang et al. | 134/26 |
| 6,165,279 A | * | 12/2000 | Tsao et al. | 134/3 |
| 6,392,417 B1 | * | 5/2002 | Knotter et al. | 324/439 |
| 2002/0105345 A1 | * | 8/2002 | Yasuda et al. | 324/691 |
| 2005/0274396 A1 | * | 12/2005 | Shih et al. | 134/29 |
| 2007/0051699 A1 | * | 3/2007 | Kiehlbauch et al. | 216/67 |
| 2011/0146909 A1 | | 6/2011 | Shih et al. | |

FOREIGN PATENT DOCUMENTS

JP    404072727 A  *  3/1992

(Continued)

OTHER PUBLICATIONS

Korean Office Action mailed on Dec. 29, 2011 for Application No. 10-2009-46779 w/ English translation.

(Continued)

*Primary Examiner* — Bibi Carrillo
(74) *Attorney, Agent, or Firm* — Smith, Gambrell & Russell, LLP (57) ABSTRACT

A method is used for removing a metal contaminant deposited on a quartz member selected from the group consisting of a reaction tube, wafer boat, and heat-insulating cylinder of a vertical heat processing apparatus for a semiconductor process. The method includes obtaining the quartz member unattached to the vertical heat processing apparatus; then, performing diluted hydrofluoric acid cleaning of cleaning the quartz member by use of diluted hydrofluoric acid; then, performing first purified water cleaning of cleaning the quartz member by use of purified water; then, performing hydrochloric acid cleaning of cleaning the quartz member by use of hydrochloric acid; and then, performing second purified water cleaning of cleaning the quartz member by use of purified water.

20 Claims, 6 Drawing Sheets

FOREIGN PATENT DOCUMENTS

| | | | |
|---|---|---|---|
| JP | 407283182 A | * | 10/1995 |
| JP | 11-191548 | | 7/1999 |
| JP | 2005-319370 | | 11/2005 |
| JP | 2006-119624 | | 5/2006 |
| JP | 2006-188419 | | 7/2006 |
| JP | 2006-253552 | | 9/2006 |
| KR | 10-2007-0033419 | | 3/2007 |
| WO | 2005/123282 | | 12/2005 |

OTHER PUBLICATIONS

Chinese Office Action mailed on Nov. 25, 2011 for Application No. 200910145230.6 w/ English translation.

Japanese Office Action mailed on May 29, 2012 for Application No. 2008-140714 w/ English language translation.

* cited by examiner

REMOVAL OF METAL CONTAMINANT DEPOSITED ON QUARTZ MEMBER OF VERTICAL HEAT PROCESSING APPARATUS

BACKGROUND OF THE INVENTION

1. Field of the Invention

The present invention relates to a method and system for removing a metal contaminant deposited on a quartz member selected from the group consisting of a reaction tube, wafer boat, and heat-insulating cylinder of a vertical heat processing apparatus for a semiconductor process. The term "semiconductor process" used herein includes various kinds of processes which are performed to manufacture a semiconductor device or a structure having wiring layers, electrodes, and the like to be connected to a semiconductor device, on a target substrate, such as a semiconductor wafer or a glass substrate used for an FPD (Flat Panel Display), e.g., an LCD (Liquid Crystal Display), by forming semiconductor layers, insulating layers, and conductive layers in predetermined patterns on the target substrate.

2. Description of the Related Art

In recent years, owing to the demands of increased miniaturization of device patterns along with increased integration of semiconductor devices, it is required to adopt a narrower acceptable range of a contaminant deposited on a semiconductor wafer. Accordingly, before a quartz member, such as a reaction tube, wafer boat, or heat-insulating cylinder, is used in a vertical heat processing apparatus for a semiconductor process, cleaning is performed on the quartz member to remove contaminants, such as a metal contaminant, deposited on the quartz member.

When such cleaning is performed on a quartz member, DHF cleaning is adopted such that the quartz member is first cleaned by use of diluted hydrofluoric acid (DHF), which has been prepared by diluting hydrofluoric acid (HF) with purified water (DIW), and is then cleaned by use of purified water, for example. Jpn. Pat. Appln. KOKAI Publication No. 2006-188419 discloses a cleaning method in which a quartz glass tool or member is cleaned by use of an acid and is then cleaned by ultrasonic cleaning in a purified water set at 30 to 70° C. to remove metal contaminants.

BRIEF SUMMARY OF THE INVENTION

An object of the present invention is to provide a method and system that can reliably remove a metal contaminant deposited on a quartz member selected from the group consisting of a reaction tube, wafer boat, and heat-insulating cylinder of a vertical heat processing apparatus for a semiconductor process.

According to a first aspect of the present invention, there is provided a method for removing a metal contaminant deposited on a quartz member selected from the group consisting of a reaction tube, wafer boat, and heat-insulating cylinder of a vertical heat processing apparatus for a semiconductor process, the method comprising: obtaining the quartz member unattached to the vertical heat processing apparatus; then, performing diluted hydrofluoric acid cleaning of cleaning the quartz member by use of diluted hydrofluoric acid; then, performing first purified water cleaning of cleaning the quartz member by use of purified water; then, performing hydrochloric acid cleaning of cleaning the quartz member by use of hydrochloric acid; and then, performing second purified water cleaning of cleaning the quartz member by use of purified water.

According to a second aspect of the present invention, there is provided a system for removing a metal contaminant deposited on a quartz member selected from the group consisting of a reaction tube, wafer boat, and heat-insulating cylinder of a vertical heat processing apparatus for a semiconductor process, the system comprising: a diluted hydrofluoric acid cleaning section configured to clean the quartz member by use of diluted hydrofluoric acid; a hydrochloric acid cleaning section configured to clean the quartz member by use of hydrochloric acid; a purified water cleaning section configured to clean the quartz member by use of purified water; and a control section configured to control an operation of the system, wherein the control section is preset to execute a method comprising performing diluted hydrofluoric acid cleaning of cleaning the quartz member unattached to the vertical heat processing apparatus by use of diluted hydrofluoric acid in the diluted hydrofluoric acid cleaning section, then, performing first purified water cleaning of cleaning the quartz member by use of purified water in the purified water cleaning section, then, performing hydrochloric acid cleaning of cleaning the quartz member by use of hydrochloric acid in the hydrochloric acid cleaning section, and then, performing second purified water cleaning of cleaning the quartz member by use of purified water in the purified water cleaning section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 6:
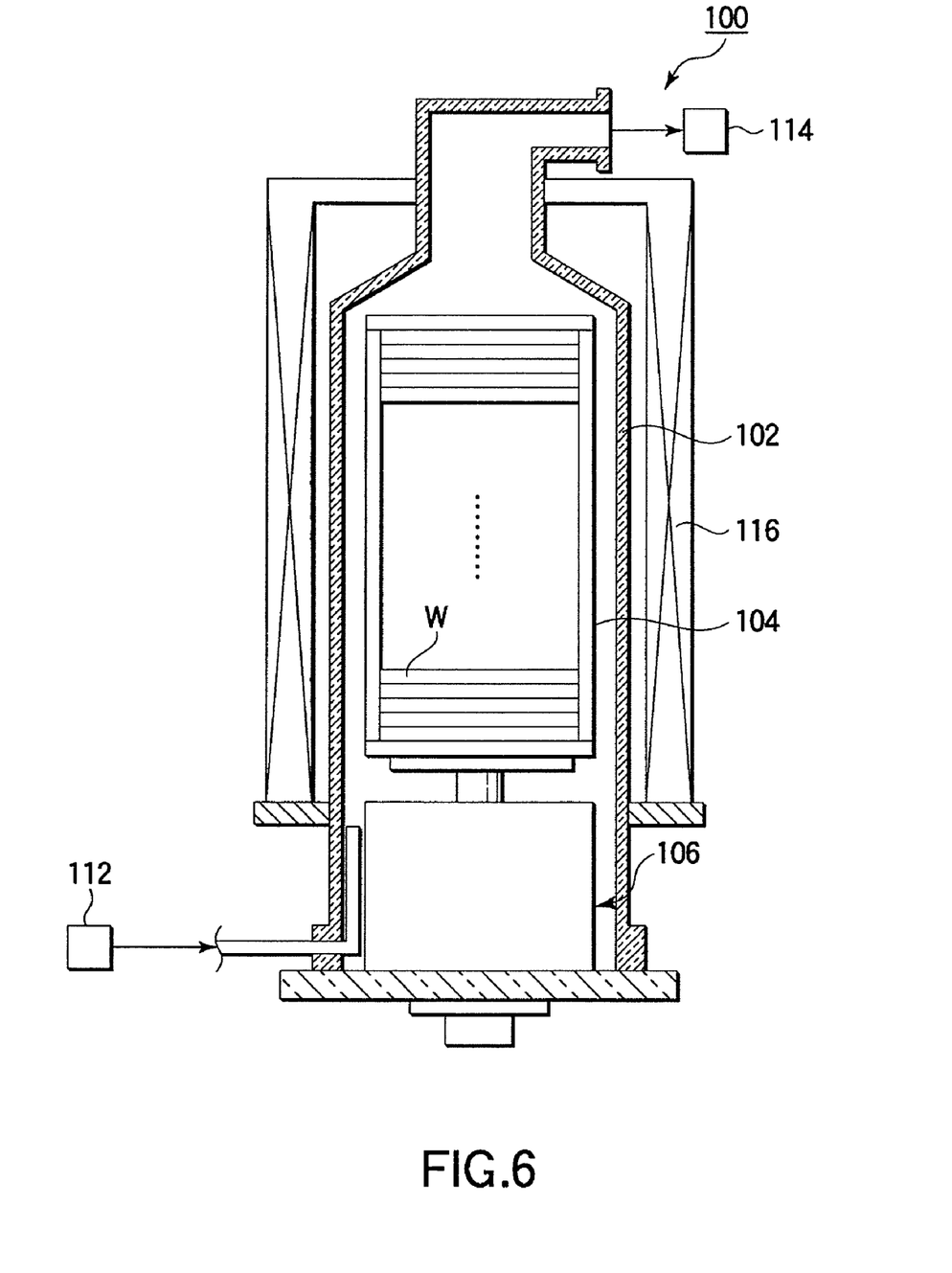
FIG. 6 is a view schematically showing a vertical heat processing apparatus (vertical film formation apparatus) for a semiconductor process employing quartz members (such as a reaction tube, wafer boat, and heat-insulating cylinder) to be processed by a cleaning method according to an embodiment of the present invention.

As shown in FIG. 6, a vertical heat processing apparatus (vertical film formation apparatus) for a semiconductor process is constituted with several quartz members to be processed by a cleaning method according to an embodiment of the present invention. Specifically, the processing apparatus 100 includes a vertical reaction tube 102 made of quartz and configured to perform a predetermined film formation process on a plurality of target substrates, such as semiconductor wafers (which may be referred to as wafers). The reaction tube 102 accommodates a wafer boat 104 made of quartz, which is placed on a heat-insulating cylinder 106 made of quartz. A plurality of semiconductor wafers (target substrates) are stacked at intervals on the wafer boat 104. The wafer boat 104 and heat-insulating cylinder 106 are loaded and unloaded to and from the reaction tube 102 through a transfer port formed at the bottom of the reaction tube 102. The heat-insulating cylinder 106 made of quartz is used to prevent the temperature at the bottom of the reaction tube 102 from being lowered. The reaction tube 102 is connected to a process gas supply system 112 for supplying a film formation process gas and a vacuum exhaust system 114 for exhausting gas from inside the reaction tube 102. A heater 116 is disposed around the reaction tube 102 to heat up the atmosphere inside the reaction tube 102, thereby heating the wafers W.

Conventionally, quartz members, such as the reaction tube 102, wafer boat 104, and heat-insulating cylinder 106 are cleaned by the DHF cleaning described above. However, the present inventors have found that, even where a quartz member is treated by the DHF cleaning, metal contaminants are still present on the surface of the quartz member. It would appear that metals, such as aluminum (Al), contained in the quartz bulk are dissolved into the DHF cleaning solution and are deposited onto the surface of the quartz member. In the case of Al, Al is transformed into $Al(OH)_3$ during water cleaning and is re-deposited on the quartz member. If the quartz member with $Al(OH)_3$ deposited thereon is used in a film formation process for forming a thin film on target substrates, such as semiconductor wafers, $Al(OH)_3$ is transformed into $Al_2O_3$ due to heat of 300° C. or more, and $Al_2O_3$ is diffused inside the reaction tube and Al is thereby deposited on the semiconductor wafers.

An embodiment of the present invention achieved on the basis of the findings given above will now be described with reference to the accompanying drawings. In the following description, the constituent elements having substantially the same function and arrangement are denoted by the same reference numerals, and a repetitive description will be made only when necessary.

Embodiment

Figure 1:
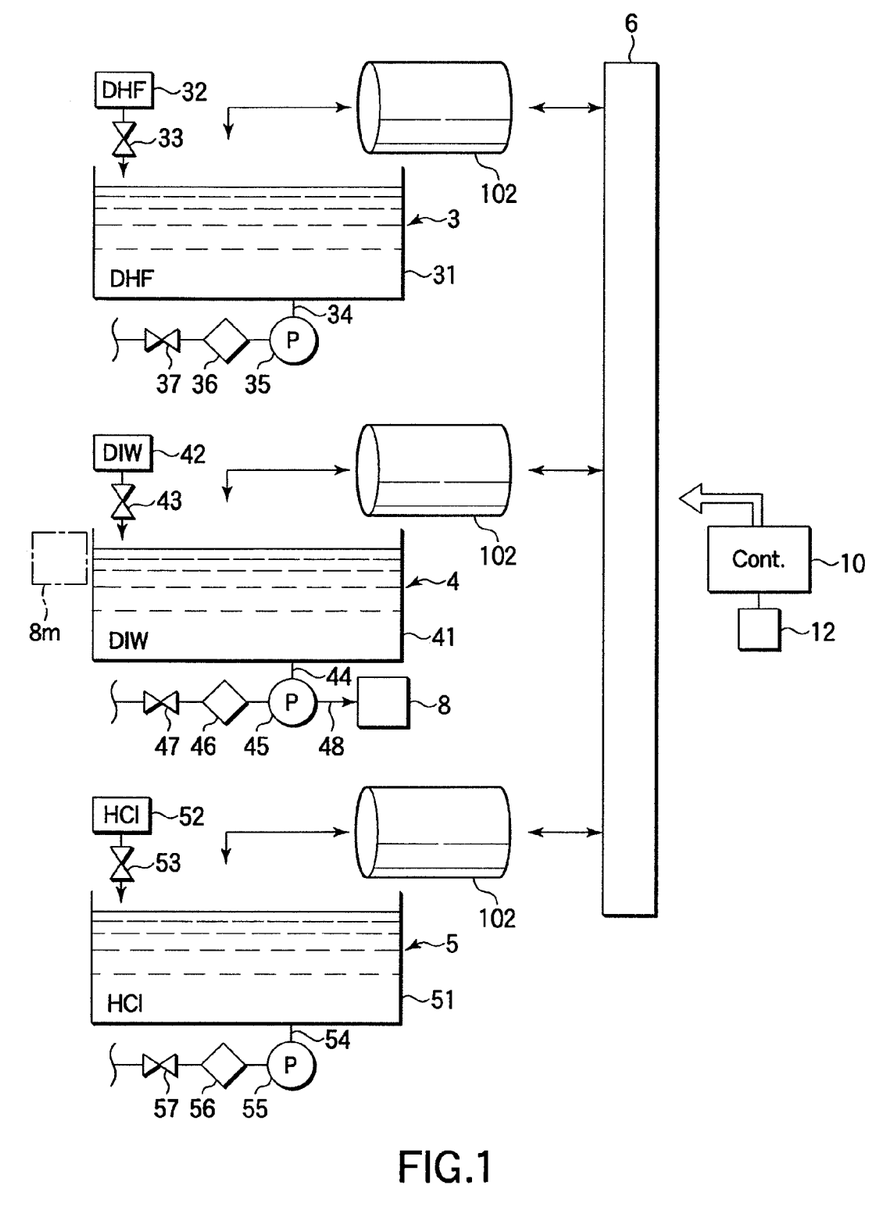
FIG. 1 is a view schematically showing a cleaning system for removing metal contaminants deposited on a quartz member, according to an embodiment of the present invention.

FIG. 1 is a view schematically showing a cleaning system for removing metal contaminants deposited on a quartz member, according to an embodiment of the present invention. As shown in FIG. 1, the quartz member cleaning system 1 includes a DHF cleaning apparatus 3, a purified water cleaning apparatus 4, and an HCl cleaning apparatus 5. The DHF cleaning apparatus 3 is configured to perform cleaning on the reaction tube 102 by use of diluted hydrofluoric acid (DHF). The purified water cleaning apparatus 4 is configured to perform cleaning on the reaction tube 102 by use of purified water (DIW: deionized water). The HCl cleaning apparatus 5 is configured to perform cleaning on the reaction tube 102 by use of hydrochloric acid (HCl).

In this embodiment, the quartz member cleaning system 1 includes three cleaning apparatuses each having its own cleaning vessel, i.e., the DHF cleaning apparatus 3, purified water cleaning apparatus 4, and HCl cleaning apparatus 5. However, for example, one or both of the DHF cleaning apparatus 3 and HCl cleaning apparatus 5 may be formed of a cleaning apparatus having a purified water cleaning function. In this case, the cleaning apparatus can perform cleaning on the reaction tube 102 by use of purified water as well as cleaning on the reaction tube 102 by use of DHF or HCl. According to such an embodiment of the present invention, a quartz member cleaning system needs to have only two cleaning apparatuses.

As shown in FIG. 1, the DHF cleaning apparatus 3 includes a cleaning vessel 31 that stores DHF. The cleaning vessel 31 is made of a material containing no metal contaminant source, such as synthetic resin, glass, or ceramic. A DHF supply source 32 for supplying DHF preset at a predetermined concentration is disposed above the cleaning vessel 31 and is connected to a valve 33 for adjusting the amount of DHF supplied from the DHF supply source 32. Accordingly, a predetermined amount of DHF can be supplied from the DHF supply source 32 through the valve 33 into the cleaning vessel 31.

The cleaning vessel 31 of the DHF cleaning apparatus 3 is connected to a discharge line 34 at the bottom, so that DHF drainage can be discharged from inside the cleaning vessel 31 through the discharge line 34. The discharge line 34 is provided with a pump 35, a filter 36, and a valve 37 in this order from the upstream side. The pump 35 is used to forcibly discharge DHF drainage from inside the cleaning vessel 31 through the discharge line 34. The filter 36 is configured to remove contaminants, such as metal contaminants, from DHF drainage discharged through the discharge line 34. The opening degree of the valve 37 is controlled to adjust the amount of DHF drainage discharged through the discharge line 34. The DHF cleaning apparatus 3 may be structured such that DHF drainage is recycled after contaminants are removed therefrom by the filter 36 or the like.

The purified water cleaning apparatus 4 includes a cleaning vessel 41 that stores purified water. The cleaning vessel 41 is made of a material containing no metal contaminant source, such as synthetic resin, glass, or ceramic, as in the cleaning vessel 31. A purified water supply source 42 for supplying purified water is disposed above the cleaning vessel 41 and is connected to a valve 43 for adjusting the amount of purified water supplied from the purified water supply source 42. Accordingly, a predetermined amount of purified water can be supplied from the purified water supply source 42 through the valve 43 into the cleaning vessel 41.

The cleaning vessel 41 of the purified water cleaning apparatus 4 is connected to a discharge line 44 at the bottom, so that drainage can be discharged from inside the cleaning vessel 41 through the discharge line 44. The discharge line 44 is provided with a pump 45, a filter 46, and a valve 47 in this order from the upstream side, as in the discharge line 34.

The discharge line 44 is connected to a bypass line 48 for supplying drainage from the cleaning vessel 41 to a measuring unit 8, such as a particle counter. The particle counter is configured to count the number of particles contained in drainage supplied through the bypass line 48. The number of particles thus measured is used as an index of removal of a metal contaminant to make a judgment of whether or not cleaning needs to be performed again, as described later.

In place of the measuring unit 8 connected to the bypass line 48, a measuring unit 8m (see the phantom lines in FIG. 1), such as a particle counter, may be disposed to measure the cleaning liquid overflowing from the cleaning vessel 41. Also in this modification, an index of removal of a metal contaminant can be obtained from the cleaning liquid used in the purified water cleaning apparatus 4.

The HCl cleaning apparatus 5 includes a cleaning vessel 51 that stores HCl. The cleaning vessel 51 is made of a material containing no metal contaminant source, such as synthetic resin, glass, or ceramic, as in the cleaning vessel 31. An HCl supply source 52 for supplying HCl preset at a predetermined concentration is disposed above the cleaning vessel 51 and is connected to a valve 53 for adjusting the amount of HCl supplied from the HCl supply source 52. Accordingly, a predetermined amount of HCl can be supplied from the HCl supply source 52 through the valve 53 into the cleaning vessel 51.

The cleaning vessel 51 of the HCl cleaning apparatus 5 is connected to a discharge line 54 at the bottom, so that HCl drainage can be discharged from inside the cleaning vessel 51 through the discharge line 54. The discharge line 54 is provided with a pump 55, a filter 56, and a valve 57 in this order from the upstream side, as in the discharge line 34.

The quartz member cleaning system 1 further includes a transfer apparatus 6. The transfer apparatus 6 can be selected from various transfer apparatuses, as long as the apparatus is usable to transfer a quartz member, such as the reaction tube 102, among the DHF cleaning apparatus 3, purified water cleaning apparatus 4, and HCl cleaning apparatus 5. For example, for the DHF cleaning apparatus 3, the transfer apparatus 6 transfers the reaction tube 102 to the cleaning vessel 31 of the DHF cleaning apparatus 3, then keeps the reaction tube 102 being immersed in the cleaning vessel 31 for a predetermined time, and then takes the reaction tube 102 out of the cleaning vessel 31 of the DHF cleaning apparatus 3.

The cleaning system 1 further includes a control section 10 formed of, e.g., a computer to control the entire system. The control section 10 can control a cleaning process as described below in accordance with process recipes stored in the storage section 12 thereof in advance, with reference to the conditions of a cleaning target quartz member and so forth. In the storage section 12, the relationship between the conditions of each quartz member and the conditions of each process liquid is also stored as control data in advance. Accordingly, the control section 10 can control the respective components of the cleaning system 1 (such as the DHF cleaning apparatus 3, purified water cleaning apparatus 4, HCl cleaning apparatus 5, transfer apparatus 6, and measuring unit 8), based on the stored process recipes and control data. Examples of a storage medium used in the storage section 12 are a magnetic disk (flexible disk, hard disk (a representative of which is a hard disk included in the storage section), etc.), an optical disk (CD, DVD, etc.), a magneto-optical disk (MO, etc.), and a semiconductor memory.

Figure 2:
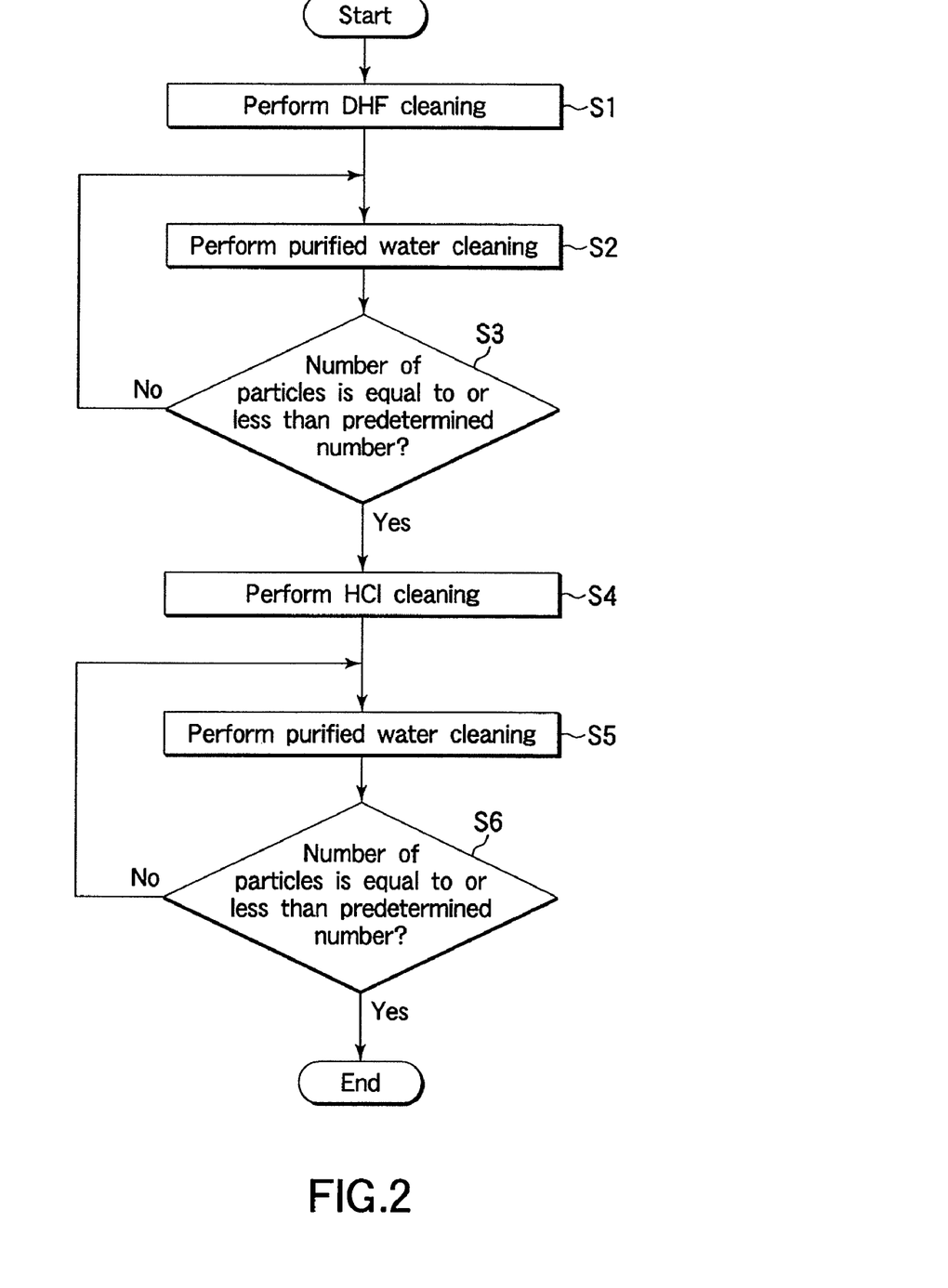
FIG. 2 is a flow chart showing the sequence of a cleaning method for removing a metal contaminant deposited on a quartz member, according to an embodiment of the present invention.

Next, an explanation will be given of a quartz member cleaning method according to an embodiment of the present invention. In this quartz member cleaning method, a quartz member (such as the reaction tube 102) unattached to the vertical heat processing apparatus 100 is processed by DHF cleaning and purified water cleaning, and is then further processed by HCl cleaning and purified water cleaning. FIG. 2 is a flow chart showing the sequence of a cleaning method for removing a metal contaminant deposited on a quartz member, according to an embodiment of the present invention. In the following explanation, the operations of the apparatuses of the quartz member cleaning system 1 are controlled by the control section 10. This embodiment will be explained while taking as an example a case where purified water cleaning is finished when the number of particles contained in drainage from the purified water cleaning is equal to or less than a predetermined number.

At first, the reaction tube 102 to be processed as a cleaning target is detached from the vertical heat processing apparatus 100. Then, the reaction tube 102 is manually and mechanically conveyed from the vertical heat processing apparatus 100 to the cleaning system 1. Alternatively, before being attached to the vertical heat processing apparatus 100, the reaction tube 102 as a brand new product may be conveyed to the cleaning system 1.

The reaction tube 102 or cleaning target thus conveyed is first processed by DHF cleaning (Step S1). Specifically, the DHF cleaning apparatus 3 (valve 33) is controlled, so that DHF preset at a predetermined concentration is supplied into the cleaning vessel 31 of the DHF cleaning apparatus 3. Further, the transfer apparatus 6 is controlled to transfer the reaction tube 102 or cleaning target to the DHF cleaning apparatus 3. Then, the reaction tube 102 thus transferred is put into (loaded into) the cleaning vessel 31 filled with DHF, and is kept immersed in the cleaning vessel 31 for a predetermined time. The DHF cleaning of the reaction tube 102 is finished with the lapse of the predetermined time during which the reaction tube 102 is kept immersed in the cleaning vessel 31.

The reaction tube 102 processed by the DHF cleaning is then processed by purified water cleaning (Step S2). Specifically, the transfer apparatus 6 is controlled to pick up the reaction tube 102 processed by the DHF cleaning out of the cleaning vessel 31 and to transfer the reaction tube 102 to the purified water cleaning apparatus 4. Further, the purified water cleaning apparatus 4 (valve 43) is controlled, so that purified water is supplied into the cleaning vessel 41 of the purified water cleaning apparatus 4. Then, the reaction tube 102 thus transferred is put into the cleaning vessel 41 filled with purified water, and is kept immersed in the cleaning vessel 41 for a predetermined time.

Then, a judgment is made of whether or not the purified water cleaning should be finished (Step S3). Specifically, a judgment is made of whether or not the number of particles contained in drainage from the purified water cleaning is equal to or less than a predetermined number. For this judgment, the transfer apparatus 6 is controlled to pick up the reaction tube 102 processed by the purified water cleaning out of the cleaning vessel 41. Further, the pump 45 and valve 47 of the purified water cleaning apparatus 4 are controlled, so that drainage is discharged from inside the cleaning vessel 41 into the discharge line 4, and a predetermined amount of drainage is supplied through the bypass line 48 into the measuring unit 8 (particle counter). When the drainage is supplied into the particle counter, the particle counter is controlled to measure the number of particles contained in the drainage thus supplied. The control section 10 uses the number of particles thus measured as an index of removal of a metal contaminant and makes a judgment based thereon as to whether or not the purified water cleaning should be finished.

Specifically, when the number of particles is judged as being larger than the predetermined number (Step S3; No), the process flow returns to Step S2 to perform the purified water cleaning again. In this case, the purified water cleaning apparatus 4 (valve 43) is controlled, so that purified water is supplied into the cleaning vessel 41 of the purified water cleaning apparatus 4. Then, the reaction tube 102 is put into the cleaning vessel 41 filled with purified water, and is kept immersed in the cleaning vessel 41 for a predetermined time.

On the other hand, when the number of particles is judged as being equal to or less than the predetermined number (Step S3; Yes), the reaction tube 102 processed by the purified water cleaning is then processed by HCl cleaning (Step S4). Specifically, the HCL cleaning apparatus 5 (valve 53) is controlled, so that HCL preset at a predetermined concentration is supplied into the cleaning vessel 51 of the HCL cleaning apparatus 5. Further, the transfer apparatus 6 is controlled to transfer the reaction tube 102 processed by the purified water cleaning to the HCL cleaning apparatus 5. Then, the reaction tube 102 thus transferred is put into the cleaning vessel 51 filled with HCL, and is kept immersed in the cleaning vessel 51 for a predetermined time. The HCL cleaning of the reaction tube 102 is finished with the lapse of the predetermined time during which the reaction tube 102 is kept immersed in the cleaning vessel 51.

The concentration of HCl supplied into the cleaning vessel 51 of the HCl cleaning apparatus 5 is preset at a value to remove metal contaminants, such as Al, deposited on the surface of the reaction tube 102 and to prevent the material of the reaction tube 102, i.e., quartz, from being etched. For example, the HCl concentration is preferably preset at 1 to 30 wt %, and more preferably at 5 to 15 wt %.

The reaction tube 102 processed by the HCL cleaning is then processed by purified water cleaning (Step S5). Specifically, the transfer apparatus 6 is controlled to pick up the reaction tube 102 processed by the HCL cleaning out of the cleaning vessel 51 and to transfer the reaction tube 102 to the purified water cleaning apparatus 4. Further, the purified water cleaning apparatus 4 (valve 43) is controlled, so that purified water is supplied into the cleaning vessel 41 of the purified water cleaning apparatus 4. Then, the reaction tube 102 thus transferred is put into the cleaning vessel 41 filled with purified water, and is kept immersed in the cleaning vessel 41 for a predetermined time.

Then, a judgment is made of whether or not the number of particles contained in drainage from the purified water cleaning is equal to or less than a predetermined number (Step S6). For this judgment, the transfer apparatus 6 is controlled to pick up the reaction tube 102 processed by the purified water cleaning out of the cleaning vessel 41. Further, as in Step S3, drainage is discharged from inside the cleaning vessel 41 into the discharge line 4, and a predetermined amount of drainage is supplied through the bypass line 48 into the measuring unit 8 (particle counter). When the drainage is supplied into the particle counter, the particle counter is controlled to measure the number of particles contained in the drainage thus supplied. The control section 10 uses the number of particles thus measured as an index of removal of a metal contaminant and makes a judgment based thereon as to whether or not the purified water cleaning should be finished.

Specifically, when the number of particles is judged as being larger than the predetermined number (Step S6; No), the process flow returns to Step S5 to perform the purified water cleaning again. In this case, the purified water cleaning apparatus 4 (valve 43) is controlled, so that purified water is supplied into the cleaning vessel 41 of the purified water cleaning apparatus 4. Then, the reaction tube 102 is put into the cleaning vessel 41 filled with purified water, and is kept immersed in the cleaning vessel 41 for a predetermined time.

Figure 3:
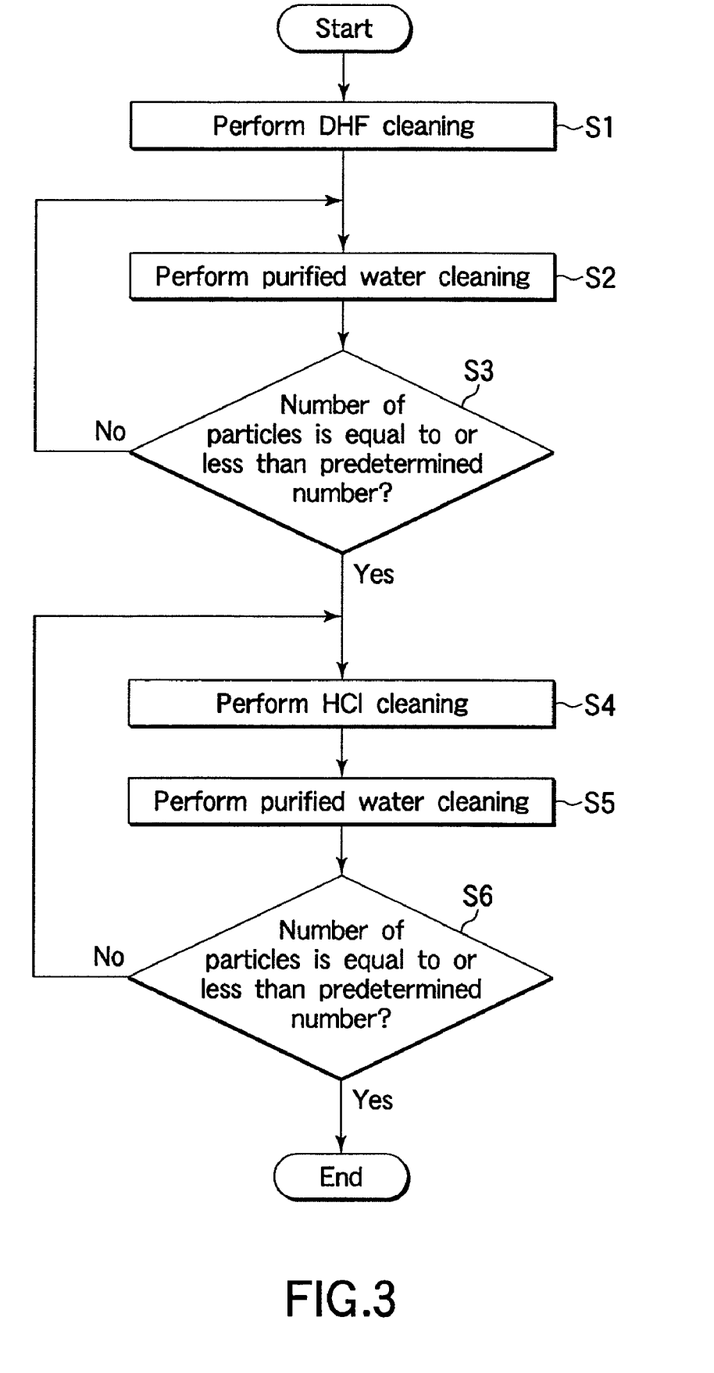
FIG. 3 is a flow chart showing the sequence of a cleaning method for removing a metal contaminant deposited on a quartz member, according to a modification of the embodiment.
Figure 4A:
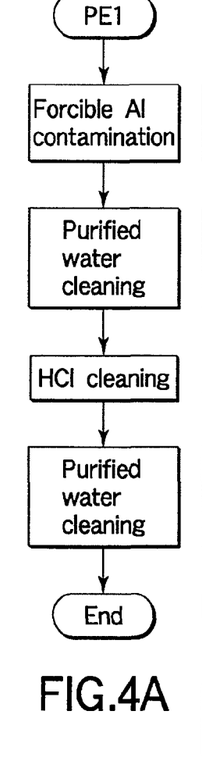
FIGS. 4A, 4B, 4C, 4D, and 4E are views respectively showing the process sequences of present examples PE1 and PE2 and comparative examples CE1, CE2, and CE3 used in an experiment.
Figure 4B:
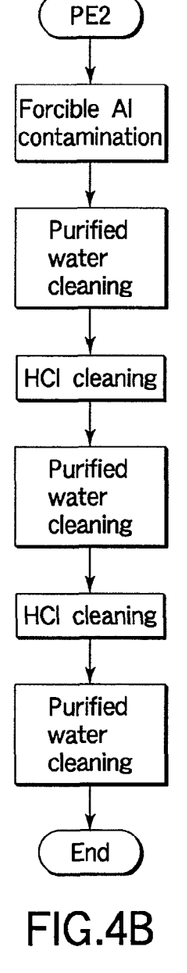
Figure 4C:
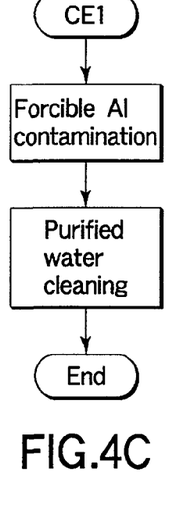
Figure 4D:
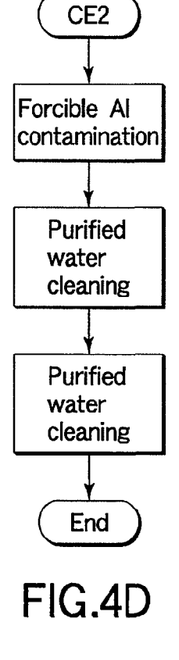
Figure 4E:
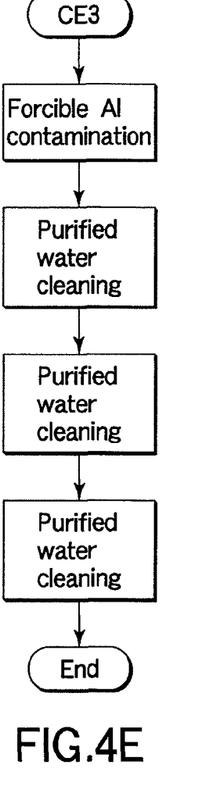

Alternatively, when the number of particles is judged as being larger than the predetermined number (Step S6; No), the process flow may return to Step S4 to perform the HCl cleaning (Step S4) and the purified water cleaning (Step S5) again, as shown in FIG. 3. In this case, contaminants can be more reliably removed.

On the other hand, when the number of particles is judged as being equal to or less than the predetermined number (Step S6; Yes), the process flow is ended.

<Experiment>

In order to confirm some effects of the present invention, a synthetic quartz substrate contaminated with aluminum was subjected to each of the cleaning processes preset to use different conditions. Then, the amount of aluminum (atoms/cm2) contained in drainage from the final step of each cleaning process was measured. FIGS. 4A, 4B, 4C, 4D, and 4E are views respectively showing the process sequences of present examples PE1 and PE2 and comparative examples CE1, CE2, and CE3 used in this experiment. In the present examples PE1 and PE2, the HCl cleaning was performed by use of an HCl concentration of 10 wt %. Since synthetic quartz contains no aluminum, the synthetic quartz substrate was forcibly contaminated with Al at the beginning of each process.

Figure 5:
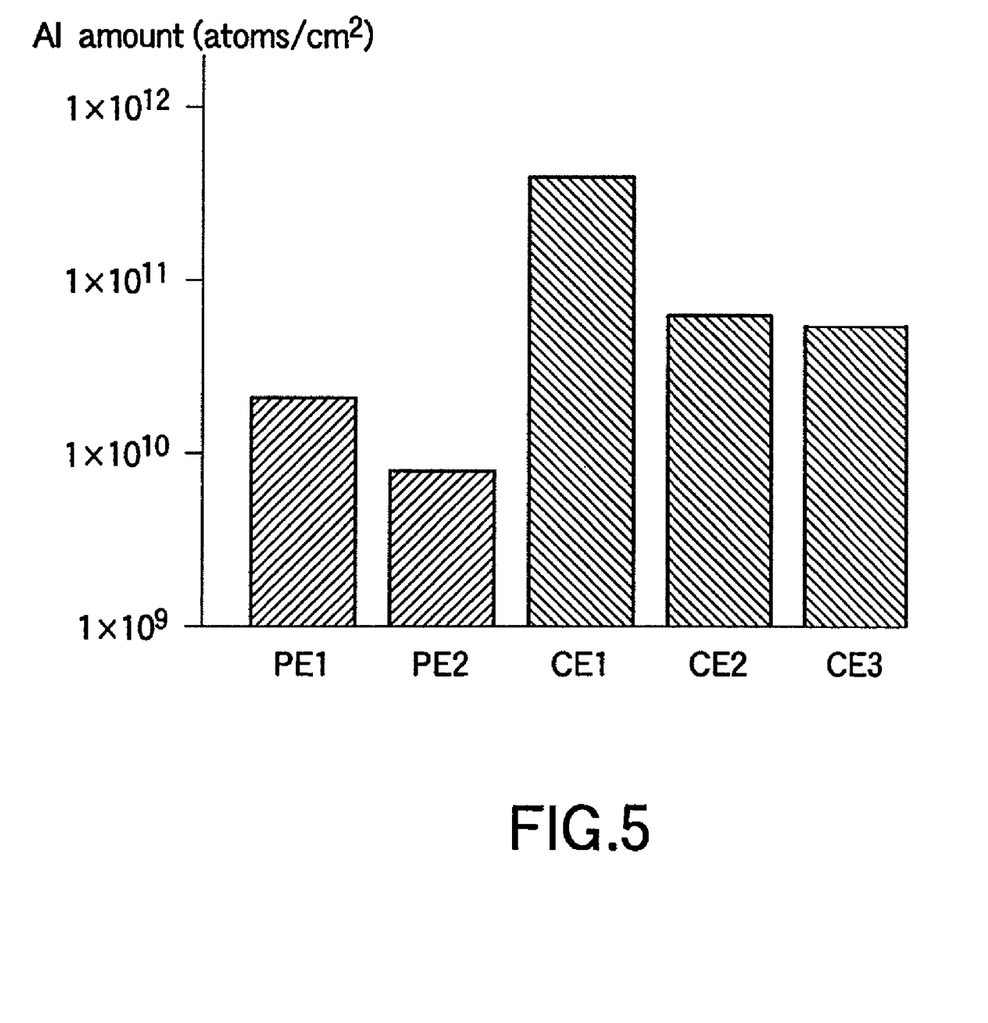
FIG. 5 is a graph showing the amount of aluminum contained in the drainage from the final step of the present examples PE1 and PE2 and comparative examples CE1, CE2, and CE3, obtained by the experiment.

FIG. 5 is a graph showing the amount of aluminum contained in the drainage from the final step of the present examples PE1 and PE2 and comparative examples CE1, CE2, and CE3, obtained by the experiment. As shown in FIG. 5, it was confirmed that the amount of aluminum contained in the drainage from the final step was decreased by performing the HCl cleaning and purified water cleaning. Further, as indicated by comparison between the present examples PE1 and PE2, it was confirmed that the amount of aluminum contained in the drainage from the final step was greatly decreased by performing the HCl cleaning and purified water cleaning a plurality of times.

As indicated by the comparative examples CE1, CE2, and CE3, the amount of aluminum contained in the drainage from the final step was decreased somewhat by performing the purified water cleaning a plurality of times without performing the HCl cleaning. However, the difference in the amount of aluminum between the comparative examples CE2 and CE3 was small, and the comparative example CE3 rendered a relatively high value (about $5 \times 10^{10}$ (atoms/cm$^2$)). Accordingly, it is confirmed that repeating the purified water cleaning unlikely further decreases the amount of aluminum, and a combination of the HCl cleaning and purified water cleaning is effective to further decrease the amount of aluminum.

<Consequence and Modification>

As described above, according to this embodiment, the reaction tube 102 is processed by the DHF cleaning and purified water cleaning, and is then further processed by the HCl cleaning and purified water cleaning. Consequently, a metal contaminant, such as aluminum, deposited on the reaction tube 102 can be more reliably removed.

The present invention is not limited to the embodiment described above, and it may be modified in various manners. Next, an explanation will be given of modifications according to the present invention.

In the embodiment described above, a metal contaminant to be removed is exemplified by aluminum, but this is not limiting. In this respect, it is expected that sodium (Na), magnesium (Mg), iron (Fe), titanium (Ti), and chromium (Cr) show the tendency similar to that of aluminum.

In the embodiment described above, the purified water cleaning is arranged such that the reaction tube 102 is put into the cleaning vessel 41 filled with purified water and is kept immersed in the cleaning vessel 41 for a predetermined time. Alternatively, the purified water cleaning is performed by anther method, such as an operation of showering purified water onto the reaction tube 102.

In the embodiment described above, the number of particles contained in drainage or overflow from the purified water cleaning is used to make a judgment of whether or not the purified water cleaning should be finished. Alternatively, another parameter, such as the resistivity or PH of drainage or overflow from the purified water cleaning, may be measured to make this judgment.

In the embodiment described above, the cleaning target quartz member is exemplified by the reaction tube 102. Alternatively, the cleaning target may be another quartz member, such as a wafer boat or heat-insulating cylinder, used in a vertical heat processing apparatus of the batch type.

In the embodiment described above, the DHF supply source 32 is arranged to supply DHF preset at a predetermined concentration. Alternatively, for example, an HF supply source may be disposed along with a purified water supply source to adjust the DHF concentration. Further, in the embodiment, the HCl supply source 52 is arranged to supply HCl preset at a predetermined concentration. Alternatively, an HCl supply source may be disposed along with a purified water supply source to adjust the HCl concentration.

In the embodiment described above, a judgment is made of whether or not the purified water cleaning should be finished after the purified water cleaning. Alternatively, the purified water cleaning may be finished without a judgment of whether or not the purified water cleaning should be finished.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for cleaning a quartz member while removing aluminum contained as a metal contaminant in a surface of the quartz member of a vertical heat processing apparatus for a semiconductor process, the vertical heat processing apparatus including a reaction tube configured to accommodate a plurality of target substrates, a wafer boat configured to stack the target substrates at intervals inside the reaction tube, and a heat-insulating cylinder configured to place the wafer boat thereon inside the reaction tube, the quartz member being selected from the group consisting of the reaction tube, the wafer boat, and the heat-insulating cylinder, the method being a sequence of cleaning the quartz member separated from the vertical heat processing apparatus, the sequence consisting of the steps of:

performing a diluted hydrofluoric acid cleaning process of cleaning the quartz member by use of a diluted hydrofluoric acid liquid by keeping the quartz member immersed for a predetermined time in a bath consisting of the diluted hydrofluoric acid liquid;

then, performing a first deionized water cleaning process of cleaning the quartz member by use of a first deionized water liquid by keeping the quartz member immersed for a predetermined time in a bath consisting of the first deionized water liquid;

then, making a first judgment of whether the first deionized water cleaning process should be finished, followed by further performing the first deionized water cleaning process until the first judgment results in a determination that the first deionized water cleaning process should be finished;

then, performing a hydrochloric acid cleaning process of cleaning the quartz member by use of a hydrochloric acid liquid set at an HCl concentration of 1 to 30 wt % by keeping the quartz member immersed for a predetermined time in a bath consisting of the hydrochloric acid liquid;

then, performing a second deionized water cleaning process of cleaning the quartz member by use of a second deionized water liquid by keeping the quartz member immersed for a predetermined time in a bath consisting of the second deionized water liquid; and then, making a second judgment of whether the second deionized water cleaning process should be finished, followed by further performing the second deionized water cleaning process or further performing the hydrochloric acid cleaning process and the second deionized water cleaning process until the second judgment results in a determination that the second deionized water cleaning process should be finished;

wherein the sequence ends by performing the second deionized water cleaning process after the hydrochloric acid cleaning process.

2. The method according to claim 1, wherein each of the baths of the diluted hydrofluoric acid liquid, the first deionized water liquid, the hydrochloric acid liquid, and the second deionized water liquid is formed in a cleaning vessel made of a material selected from the group consisting of synthetic resin, glass, and ceramic.

3. The method according to claim 1, wherein the first and second judgments are made by measuring a number of particles, resistivity, or pH of drainage or overflow from each of the baths of the first deionized water liquid and the second deionized water liquid, respectively, as an index of removal of the metal contaminant.

4. The method according to claim 3, wherein said measuring the number of particles, resistivity, or pH is made by discharging the first or second deionized water liquid from inside a cleaning vessel as the drainage or overflow and supplying the drainage to a measuring section.

5. The method according to claim 3, wherein for the first judgment, said measuring gives the number of particles contained in the drainage or overflow from the bath of the first deionized water liquid as a first number for comparison with a first predetermined number, the first deionized water cleaning process being performed again when the first number is larger than the first predetermined number.

6. The method according to claim 3, wherein, for the second judgment, said measuring gives the number of particles contained in the drainage or overflow from the bath of the second deionized water liquid as a second number for comparison with a second predetermined number, the second deionized water cleaning process being performed again when the second number is larger than the second predetermined number.

7. The method according to claim 3, wherein, for the second judgment, said measuring gives the number of particles contained in the drainage or overflow from the bath of the second deionized water liquid as a second number for comparison with a second predetermined number, the hydrochloric acid cleaning process and the second deionized water cleaning process being performed again when the second number is larger than the second predetermined number.

8. The method according to claim 1, wherein the hydrochloric acid cleaning process uses the hydrochloric acid liquid set at an HCl concentration of 5 to 15 wt %.

9. The method according to claim 1, wherein the baths of the first deionized water liquid and the second deionized water liquid are formed in a common cleaning vessel.

10. The method according to claim 1, wherein the bath of the diluted hydrofluoric acid liquid is formed in a cleaning vessel other than that for the bath of the hydrochloric acid liquid, the bath of the first deionized water liquid is formed in a cleaning vessel other than those for the baths of the diluted hydrofluoric acid and the hydrochloric acid liquid, and the bath of the second deionized water liquid is formed in a cleaning vessel other than those for the baths of the diluted hydrofluoric acid liquid and the hydrochloric acid liquid.

11. The method according to claim 1, wherein the index of removal of the metal contaminant is the number of particles.

12. A system for cleaning a quartz member while removing aluminum contained as a metal contaminant in a surface of the quartz member of a vertical heat processing apparatus for a semiconductor process, the vertical heat processing apparatus including a reaction tube configured to accommodate a plurality of target substrates, a wafer boat configured to stack the target substrates at intervals inside the reaction tube, and a heat-insulating cylinder configured to place the wafer boat thereon inside the reaction tube, the quartz member being selected from the group consisting of the reaction tube, the wafer boat, and the heat-insulating cylinder, the system comprising:

- a diluted hydrofluoric acid cleaning section configured to clean the quartz member by use of a diluted hydrofluoric acid liquid by keeping the quartz member immersed in a bath consisting of the diluted hydrofluoric acid liquid;
- a hydrochloric acid cleaning section configured to clean the quartz member by use of a hydrochloric acid liquid set at an HCl concentration of 1 to 30 wt % by keeping the quartz member immersed in a bath consisting of the hydrochloric acid liquid;
- a deionized water cleaning section configured to clean the quartz member by use of a deionized water liquid by keeping the quartz member immersed in a bath consisting of the deionized water liquid; and
- a control section configured to control an operation of the system and including a storage medium storing a process recipe, which, when executed, causes the control section to control the system to conduct a sequence of cleaning the quartz member separated from the vertical heat processing apparatus, the sequence consisting of:

performing a diluted hydrofluoric acid cleaning process of cleaning the quartz member by use of a diluted hydrofluoric acid liquid by keeping the quartz member immersed for a predetermined time in a bath consisting of the diluted hydrofluoric acid liquid in the diluted hydrofluoric acid cleaning section, then, performing a first deionized water cleaning process of cleaning the quartz member by use a of first deionized water liquid by keeping the quartz member immersed for a predetermined time in a bath consisting of the first deionized water liquid in the deionized water cleaning section, then, making a first judgment of whether the first deionized water cleaning process should be finished, followed by further performing the first deionized water cleaning process until the first judgment results in a determination that the first deionized water cleaning process should be finished;

then, performing a hydrochloric acid cleaning process of cleaning the quartz member by use of a hydrochloric acid liquid set at an HCl concentration of 1 to 30 wt % by keeping the quartz member immersed for a predetermined time in a bath consisting of the hydrochloric acid liquid in the hydrochloric acid cleaning section, and then, performing a second deionized water cleaning process of cleaning the quartz member by use of second deionized water liquid by keeping the quartz member immersed for a predetermined time in a bath consisting of the second deionized water liquid in the purified deionized water cleaning section; and then, making a second judgment of whether the second deionized water cleaning process should be finished, followed by further performing the second deionized water cleaning process or further performing the hydrochloric acid cleaning process and the second deionized water cleaning process until the second judgment results in a determination that the second deionized water cleaning process should be finished, wherein the sequence ends by performing the second deionized water cleaning process after the hydrochloric acid cleaning process.

13. The system according to claim 12, wherein each of the diluted hydrofluoric acid cleaning section, the deionized water cleaning section, and the hydrochloric acid cleaning section includes its own cleaning vessel.

14. The system according to claim 12, wherein the system further comprises a measuring section provided to the deionized water cleaning section and configured to measure a number of particles, resistivity, or pH of the deionized water liquid used in the deionized water cleaning section.

15. The system according to claim 12, wherein the hydrochloric acid cleaning section uses the hydrochloric acid liquid set at an HCl concentration of 5 to 15 wt %.

16. The system according to claim 13, wherein the cleaning vessel is made of a material selected from the group consisting of synthetic resin, glass, and ceramic.

17. The system according to claim 14, wherein the first and second judgments are made by measuring the number of particles, resistivity, or pH of drainage or overflow from each of the baths of the first deionized water liquid and the second deionized water liquid, respectively, as an index of removal of the metal contaminant.

18. The system according to claim 17, wherein, for the first judgment, said measuring gives the number of particles contained in the drainage or overflow from the bath of the first deionized water liquid as a first number for comparison with a first predetermined number, the first deionized water cleaning process being performed again when the first number is larger than the first predetermined number.

19. The system according to claim 17, wherein, for the second judgment, said measuring gives the number of particles contained in the drainage or overflow from the bath of the second deionized water liquid as a second number for comparison with a second predetermined number, the second deionized water cleaning process being performed again when the second number is larger than the second predetermined number.

20. The system according to claim 17, wherein for the second judgment, said measuring gives the number of particles contained in the drainage or overflow from the bath of the second deionized water liquid as a second number for comparison with a second predetermined number, the hydrochloric acid cleaning process and the second deionized water cleaning process being performed again when the second number is larger than the second predetermined number.

* * * * *